United States Patent
Iwata et al.

(10) Patent No.: US 10,243,667 B2
(45) Date of Patent: Mar. 26, 2019

(54) OPTICAL TRANSMITTER AND OPTICAL TRANSMISSION METHOD

(71) Applicant: Fujitsu Optical Components Limited, Kawasaki-shi, Kanagawa (JP)

(72) Inventors: Sukeyuki Iwata, Kawasaki (JP); Toshiki Tanaka, Setagaya (JP); Masato Nishihara, Kawasaki (JP); Naoki Kuwata, Yokohama (JP)

(73) Assignee: FUJITSU OPTICAL COMPONENTS LIMITED, Kawasaki-Shi (JP)

( * ) Notice: Subject to any disclaimer, the term of this patent is extended or adjusted under 35 U.S.C. 154(b) by 0 days.

(21) Appl. No.: 15/946,202

(22) Filed: Apr. 5, 2018

(65) Prior Publication Data
US 2018/0294888 A1    Oct. 11, 2018

(30) Foreign Application Priority Data

Apr. 7, 2017  (JP) ................. 2017-077028

(51) Int. Cl.
*H04B 10/04*   (2006.01)
*H04B 10/588*  (2013.01)
*H04B 10/61*   (2013.01)
*H04B 10/54*   (2013.01)

(52) U.S. Cl.
CPC ......... *H04B 10/588* (2013.01); *H04B 10/541* (2013.01); *H04B 10/61* (2013.01)

(58) Field of Classification Search
CPC .............. H04B 10/516; H04B 10/5161; H04B 10/2507; H04B 10/50572; H04B 10/548; H04B 10/50595; H04B 10/50575; H04B 10/505

USPC ....... 398/183, 184, 185, 186, 187, 188, 192, 398/193, 194, 195, 196, 197, 198, 199, 398/158, 159, 135, 136
See application file for complete search history.

(56) References Cited

U.S. PATENT DOCUMENTS

| | | | |
|---|---|---|---|
| 5,170,274 A | 12/1992 | Kuwata et al. | |
| 2009/0092401 A1* | 4/2009 | Sekine | G02F 1/0123 398/185 |
| 2015/0086215 A1* | 3/2015 | Chen | H04B 10/2507 398/136 |
| 2015/0256288 A1* | 9/2015 | Tanaka | H04L 1/004 714/776 |
| 2016/0099776 A1 | 4/2016 | Nakashima et al. | |
| 2016/0204869 A1* | 7/2016 | Nishihara | H04B 10/516 398/43 |
| 2016/0269121 A1 | 9/2016 | Lee et al. | |

FOREIGN PATENT DOCUMENTS

JP    3-251815    11/1991

OTHER PUBLICATIONS

Patents Abstracts of Japan English abstract for Japanese Patent Publication No. 3-251815, published Nov. 11, 1991.

* cited by examiner

*Primary Examiner* — Hanh Phan
(74) *Attorney, Agent, or Firm* — Staas & Halsey LLP

(57) ABSTRACT

An optical transmitter includes an optical modulator configured to modulate light from a light source; and a processor configured to generate a drive signal that is input into the optical modulator. The processor inserts a bias control signal amplitude-modulated at a low frequency, into an analog signal at fixed intervals, to generate the drive signal.

17 Claims, 17 Drawing Sheets

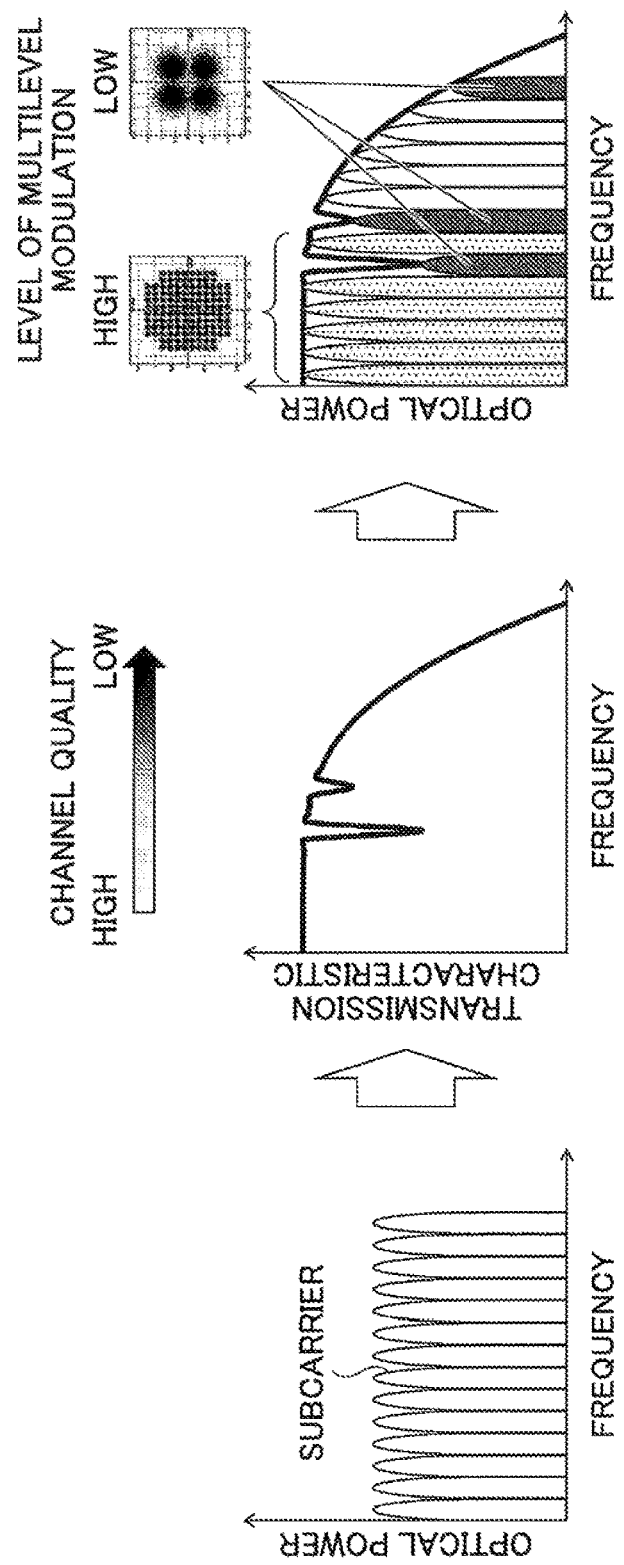

OPTICAL TRANSMITTER AND OPTICAL TRANSMISSION METHOD

CROSS-REFERENCE TO RELATED APPLICATIONS

This application is based upon and claims the benefit of priority of the prior Japanese Priority Application No. 2017-077028 filed on Apr. 7, 2017, the entire contents of which are hereby incorporated by reference.

FIELD

The present disclosure relates to an optical transmitter and an optical transmission method.

BACKGROUND

In recent years, the spread of cloud computing, cloud services, and the like make demand for improvement in the processing data rate and the data transmission rate, even greater. As optical transceivers to be used for data transmission, optical transceivers that realize the transmission rate of 100 Gbps or higher per channel are being introduced. The transmission rate over 100 Gbps is also realized by applying a DMT (Discrete Multi-Tone) scheme, which is used in the xDSL standards, to optical transmission networks.

Meanwhile, in modulation of high-speed optical transmission using a digital coherent technology, in order to prevent influence of chirping, external modulators such as a Mach-Zehnder (MZ) modulator are generally used. In an external modulator, the operating point drifts by temperature fluctuation, aging, and the like. As a method of compensating for the operating point drift in digital data transmission using an NRZ (Non-Return-to-Zero) scheme, a method has been known that superimposes a low-frequency signal on a drive signal of the optical modulator (see, for example, Patent document 1). Having superimposed with a low-frequency signal, the drive signal is amplitude-modulated gently between two levels of the logic values of input data, for example, electric potential levels corresponding to "0" level and "1" level. Then, by monitoring the output light from the optical modulator and controlling the bias voltage such that the superimposed low-frequency component is not detected, the operating point drift can be prevented.

RELATED-ART DOCUMENTS

Patent Documents

[Patent Document 1] Japanese Laid-Open Patent Publication No. H3-251815

As illustrated in FIG. 1, an external modulator has a quenching characteristic or a voltage-to-optical output characteristic, which are periodic. If the operating point (for example, a point at which the light intensity becomes one half) shifts, the intensity of light power to be output fluctuates. In the example in FIG. 1, the operating point shifts to the minus side significantly, and it is not possible to obtain a predetermined optical output. One may consider superimposing a low-frequency signal also on an analog signal generated in a DMT modulation or the like, to compensate for the operating point drift. However, if applying bias control of a conventional digital modulation scheme as it is to an analog signal, sufficient control sensitivity cannot be obtained. Meanwhile, raising the control sensitivity introduces a problem that degradation of signal transmission becomes outstanding in a nonlinear region on a quenching characteristic curve.

SUMMARY

In an aspect in the present disclosure, an optical transmitter includes an optical modulator configured to modulate light from a light source; and a processor configured to generate a drive signal that is input into the optical modulator. The processor inserts a bias control signal amplitude-modulated at a low frequency, into an analog signal at fixed intervals, to generate the drive signal.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 2 is a diagram illustrating transmission technologies of a DMT scheme;

DESCRIPTION OF EMBODIMENTS

According to an embodiment, it is possible to reduce degradation of the transmission capacity while maintaining high control sensitivity for correcting the operating point drift.

FIG. 2 is a diagram illustrating transmission technologies of a DMT scheme, as an example of optical transmission to which an embodiment in the present disclosure is applied. DMT is based on OFDM (Orthogonal Frequency Division Multiplexing), in which data is divided into multiple subcarriers to be transmitted. A transmission scheme that uses multiple carrier frequencies in this way may be referred to as "multicarrier transmission". In multicarrier transmission, a number of subcarriers are included in a predetermined frequency band. Propagation states such as channel quality may not be necessarily uniform over the entire band, and a transmission characteristic may be different among the subcarriers. In a DMT scheme, the reception status is normally monitored to confirm the channel quality when a system starts up, and depending on the transmission characteristic, the multi-value level and power allocation of each subcarrier are determined.

In a DMT scheme, a greater number of bits per symbol is allocated to a subcarrier having a better transmission characteristic. Multiple subcarriers having better transmission characteristics are bundled to perform a higher multi-value level modulation (for example, 7-bit transmission of 128 values), and a lower multi-value level modulation (for example, 2-bit transmission of four values) is performed with subcarriers having unfavorable transmission characteristics. High-speed transmission is realized by adaptively allocating the multi-value level (the number of bits) and the power level of subcarriers depending on the transmission characteristic.

Figure 1:
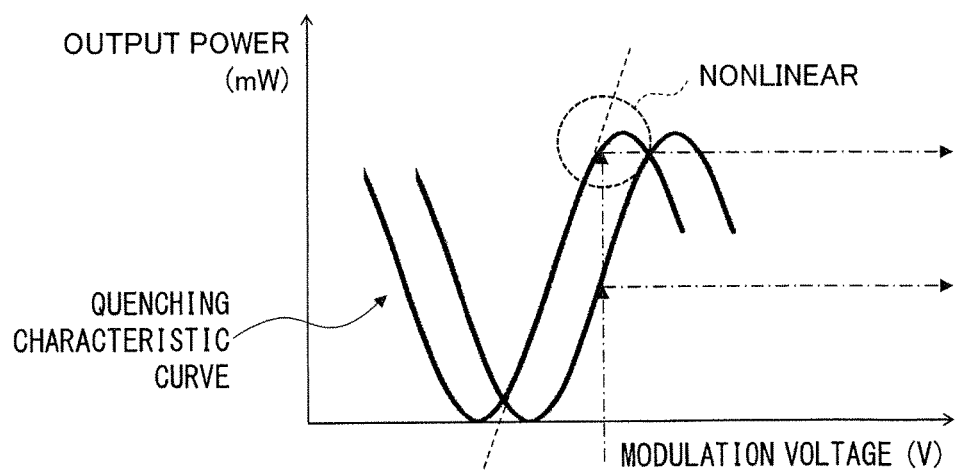
FIG. 1 is a diagram illustrating a quenching characteristic curve and an operating point drift of an external optical modulator.
Figure 3A:
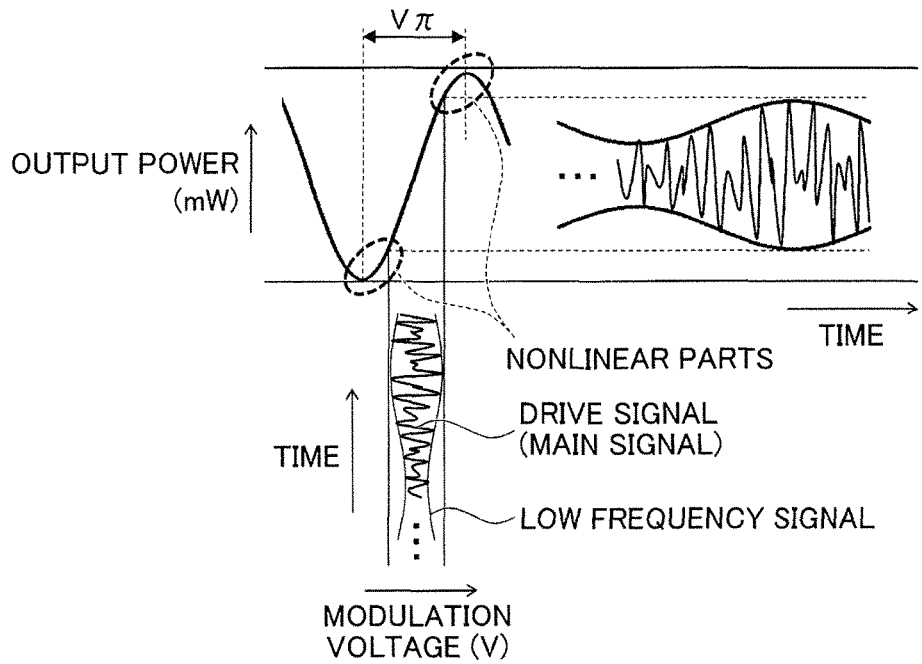
FIGS. 3A-3B are diagrams illustrating a problem that occurs when applying bias control in a conventional NRZ scheme as it is to an analog signal.
Figure 3B:
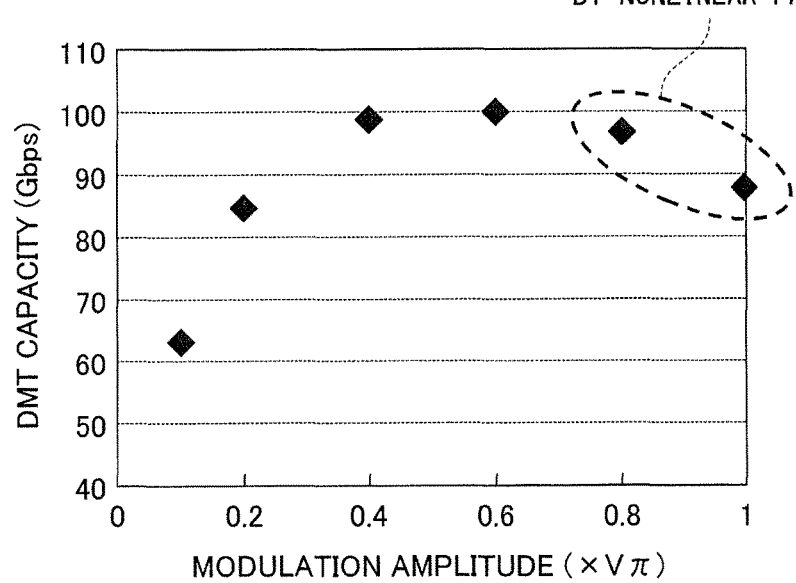

FIGS. 3A-3B are diagrams illustrating a problem that occurs when applying bias control in an NRZ scheme as it is to an analog signal. In digital modulation of an NRZ scheme, a drive signal input into an optical modulator is vibrating at a high speed with a fixed amplitude between a high electric potential level and a low electric potential level corresponding to the logic values of input data. By superimposing a low-frequency signal on the input drive signal, a gentle modulation is continuously applied to the amplitude of the drive signal in the time direction. The operating point is controlled based on the low-frequency component included in the output light of the optical modulator.

In an analog signal generated by DMT or the like, the amplitude level changes in an analog manner. The drive amplitude of an analog modulation signal is set such that modulation is performed in a linear region in a quenching characteristic curve. As illustrated in FIG. 3A, in the case where a low-frequency signal is superimposed on an input drive signal of an analog modulation scheme, if the low-frequency component is not detected in a nonlinear region near the minimum or the maximum of the quenching characteristic curve, control of drift compensation is not performed. In the case where a compensation method used for a nonlinear region is applied to a DMT signal being a modulation signal in a linear region, a sufficient drift correction effect cannot be expected.

If the amplitude of the main signal is magnified in order to raise the control sensitivity, the DMT-modulated light output from the optical modulator receives an influence of the nonlinear part of the quenching characteristic curve, and the transmission capacity degrades.

As illustrated in FIG. 3B, representing the voltage that changes the quenching characteristic from the minimum to the maximum by Vπ (half-wavelength voltage), a maximum DMT capacity can be achieved with a modulation amplitude being 0.4 to 0.6 times Vπ. If the modulation amplitude is 0.8 times Vπ or greater, it enters the nonlinear region of the quenching characteristic, at which even if the control sensitivity is improved, the DMT transmission capacity degrades.

Thereupon, in the embodiment, an optical transmission control method is provided that can prevent capacity degradation in a nonlinear region of a quenching characteristic while maintaining a high control sensitivity, so as to effectively compensate for an operating point drift.

Figure 4A:
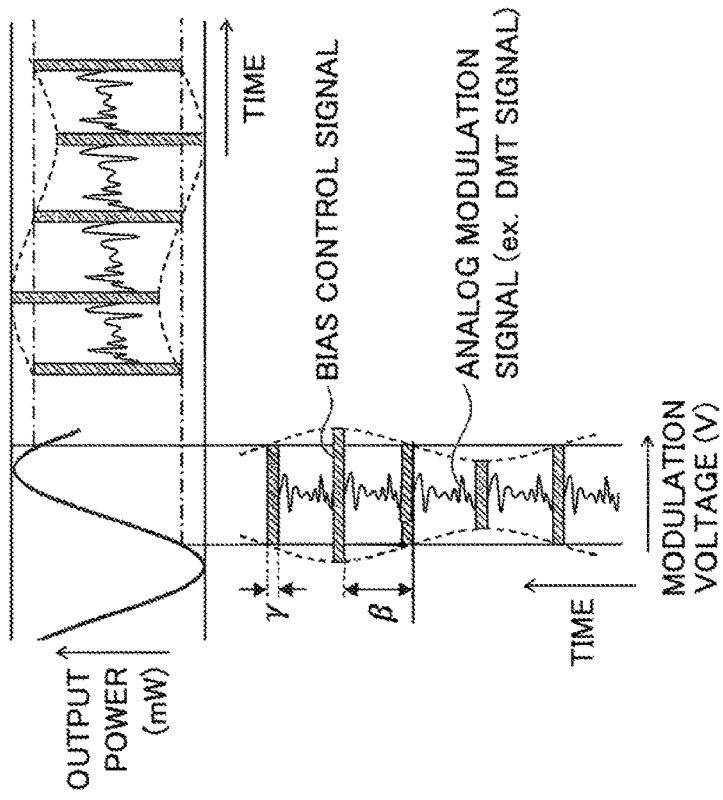
FIGS. 4A-4B are diagrams illustrating principles of bias control in an embodiment.
Figure 4B:
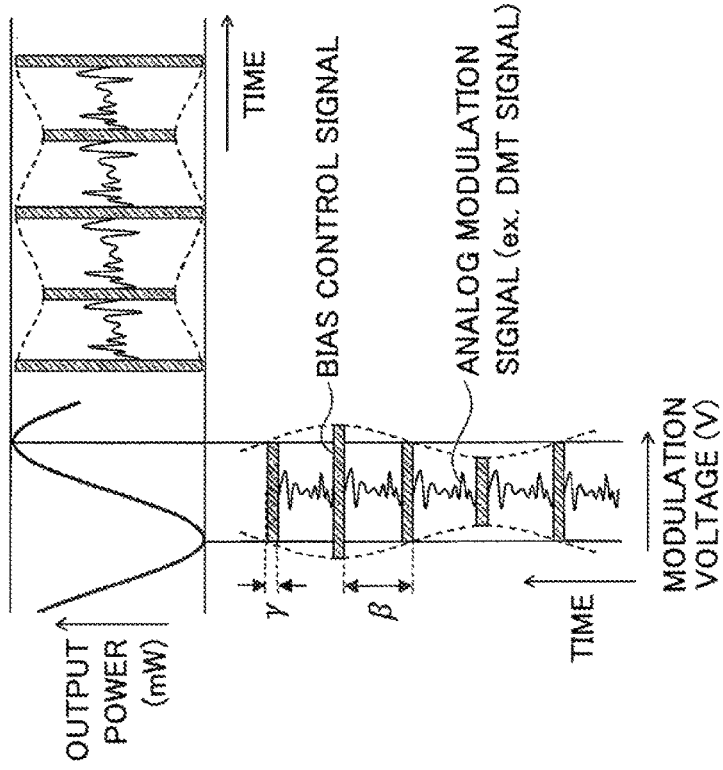

FIGS. 4A-4B are schematic views illustrating principles of bias control in the embodiment. In the embodiment, a bias control signal is inserted into an analog modulation signal input into an optical modulator at fixed intervals. In this example, a DMT modulation signal including multiple subcarrier signals is input into the optical modulator. The amplitude of the DMT modulation signal changes in an analog manner. A drive signal that has the amplitude level changing in an analog manner to drive an optical modulator in this way, will be referred to as an "analog modulation signal" for convenience's sake, to distinguish it from a drive signal of a digital modulation scheme.

It is desirable that the amplitude of the bias control signal inserted into the analog modulation signal is greater than that of the analog modulation signal as the main signal. the bias control signal has a low-frequency signal superimposed, and the envelope curves of the bias control signal are amplitude-modulated in reverse phase with each other with respect to the center of the main signal. The low frequency superimposed on the bias control signal has a frequency that is sufficiently lower compared with the frequency of the analog modulation signal input into the optical modulator, which may be, for example, a sine wave of several kHz.

The bias control signal is inserted into the analog modulation signal at fixed intervals. As an example, the bias control signal is inserted into a section in which effective transmission data signal is not included. In the OFDM scheme used as the basis of the DMT scheme, a guard section referred to as a "cyclic prefix" (CP) is provided in the head of each OFDM symbol. By inserting a cyclic prefix, it is possible to prevent an interference between subcarriers caused by collapse of the orthogonality of subcarriers in a narrow band. The bias control signal may be inserted using sections of the cyclic prefix. In a multicarrier transmission scheme that does not use the cyclic prefix, and instead, combines subcarriers not existing next to each other, the bias control signal may be inserted between a symbol of a certain subcarrier and a symbol of the next subcarrier, by providing a control section having the same length as the CP. Also, as will be described later, considering the balance between the control sensitivity and the transmission capacity, a bias control signal section may be provided that is longer than the CP or shorter than the CP.

As in FIG. 4A that illustrates a normal operation, when the operating point of the optical modulator is on an optimal bias point, the amplitude center of the input analog modulation signal is located at an operating point, for example, a bias point at one half of the change from the minimum (quenching) to the maximum (peak) of the quenching characteristic curve. In this case, bias components included in a light signal output from the optical modulator change in reverse phase with each other with respect to the amplitude center of the main signal, and cancel each other. Therefore, a bias component is not detected from the output light of the optical modulator.

As in FIG. 4B, when the operating point of the optical modulator drifts to the minus side from the optimal bias point, the higher electric potential side of the input drive signal is shifted in a direction in which the optical output power decreases, and the lower electric potential side is shifted in a direction in which the optical output power increases. Consequently, a bias component whose amplitude changes in phase with the light signal output from the optical modulator, is generated. This bias component has the amplitude that changes in a low frequency near the nonlinear region of the quenching characteristic curve, and the low-frequency component is detected from the monitored light.

In optical transmission of an analog modulation scheme such as DMT, it is possible to correct an operating point drift by monitoring the output light of an optical modulator, and by detecting whether the monitored light includes a low-frequency component of a bias control signal. Depending on the detected low-frequency component, the bias voltage applied to the optical modulator can be adjusted, which enables to control the operating point to be located on the optimal bias point.

If the operating point is shifted to the minus side from the optimal bias point, and a low-frequency component in phase with the low-frequency signal superimposed on the bias control signal is detected, it is controlled in a direction in which the bias voltage applied to the optical modulator is raised. On the other hand, if the operating point is shifted to the plus side from the optimal bias point, and a low-frequency component in reverse phase with the low-frequency signal superimposed on the bias control signal is detected, it is controlled in a direction in which the bias voltage applied to the optical modulator is reduced. Configured as such, it is possible to compensate for an operating point drift in analog light modulation.

In FIGS. 4A-4B, representing an interval or a cycle for inserting a bias control signal by β, and the time width of an inserted section by γ, the signal event probability of the bias control signal is represented by γ/β. In order to raise the control sensitivity in compensation for an operating point drift using the bias control signal, one may consider to enlarge the signal event probability γ/β of the bias control signal, or to enlarge the amplitude of the bias control signal. However, enlarging the event probability of the control signal reduces the transmission capacity of the main signal. Therefore, a configuration is required that can prevent degradation of the transmission capacity, while maintaining the control sensitivity at virtually the same level as control precision obtained with a conventional NRZ signal.

Figure 5A:
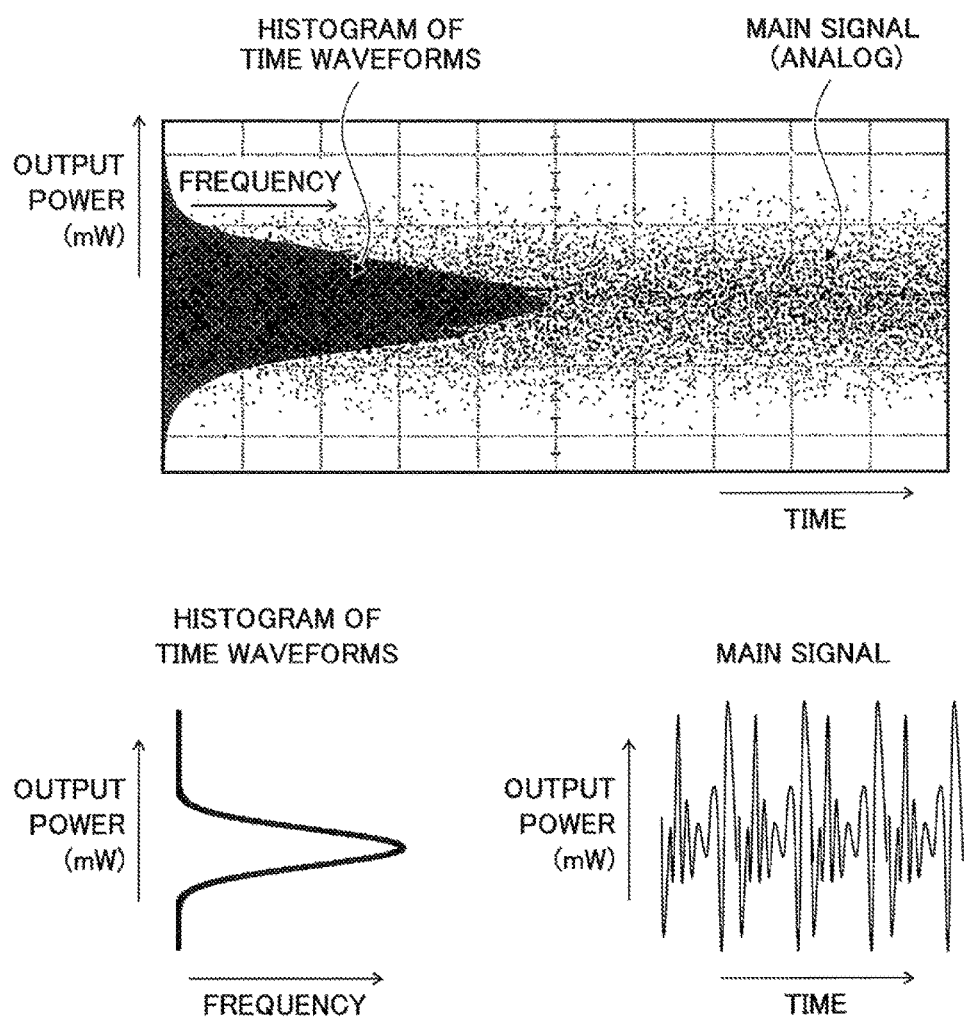
FIGS. 5A-5B are diagrams illustrating control sensitivity targeted by an embodiment.
Figure 5B:
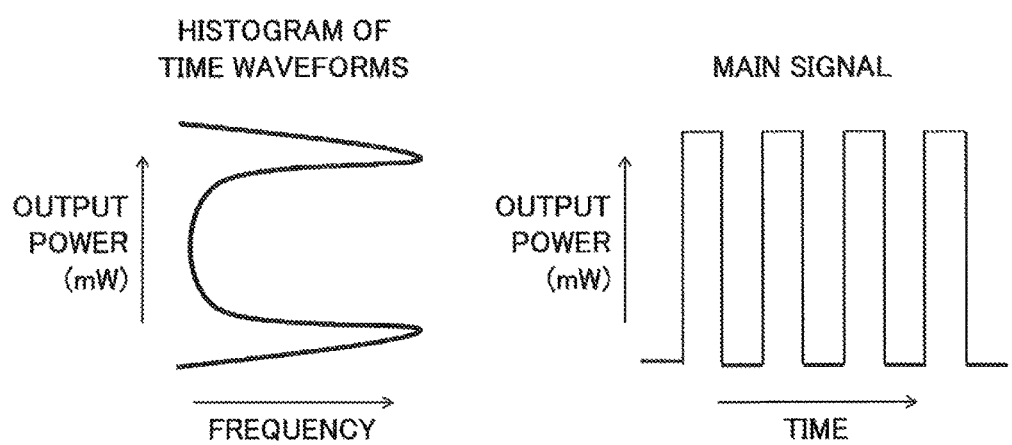

FIGS. 5A-5B are diagrams illustrating control sensitivity targeted by the embodiment. As illustrated in FIG. 5A relating to a DMT signal, a histogram of time waveforms of the DMT signal including multiple subcarriers forms virtually a normal distribution. In the case where a low-frequency component is superimposed on a non-data section of the DMT signal by the NRZ scheme, the event probability of the low-frequency bias component also forms virtually a normal distribution. On the other hand, an NRZ signal in FIG. 5B digitally changes between the low electric potential and the high electric potential, and the signal event probability becomes higher at the envelope curve parts corresponding to "0" level and "1" level in a histogram of the time waveform. The signal event probability at the envelope curve parts is supposed to be 1.

Figure 6A:
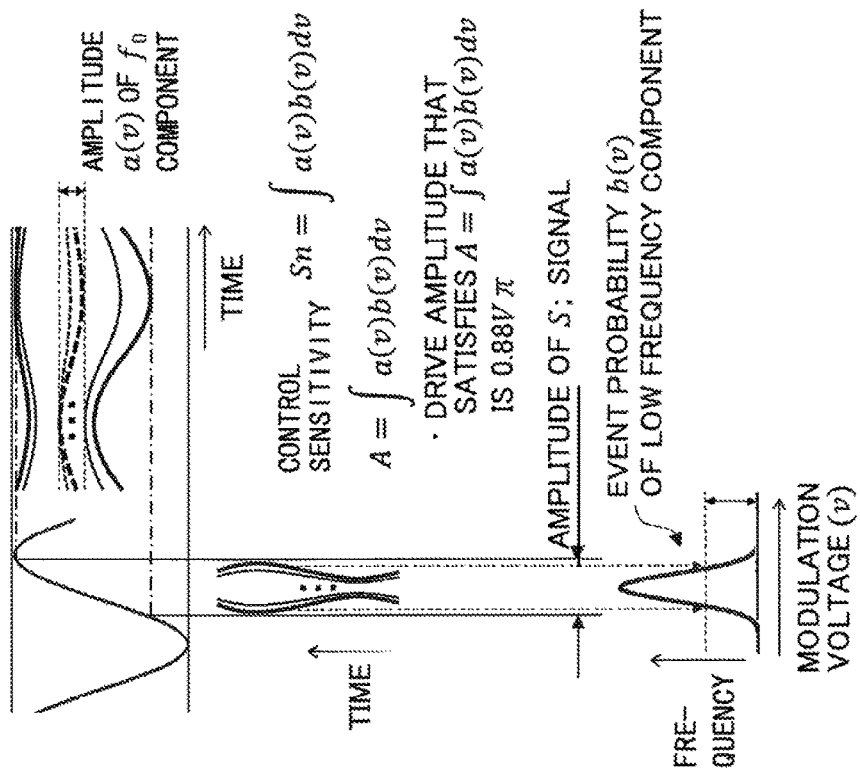
FIGS. 6A-6B are diagrams illustrating calculation of control sensitivity.
Figure 6B:
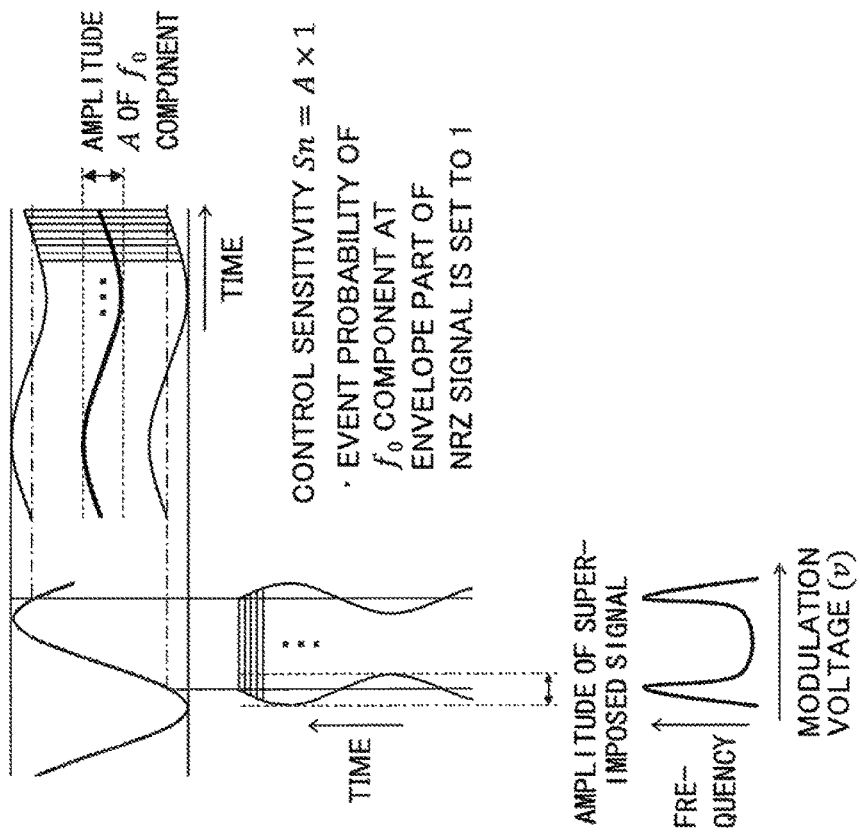

FIGS. 6A-6B are diagrams illustrating calculation of control sensitivity. FIG. 6A illustrates calculation of control sensitivity (a target value) when inputting an NRZ signal. FIG. 6B illustrates calculation of control sensitivity when compensation for an operating point drift in an NRZ scheme is applied as it is to a signal of an analog modulation scheme.

In FIG. 6A, a low-frequency signal (f0 signal) is superimposed on an NRZ drive signal that vibrates by the amplitude Vπ. Normally, the amplitude of f0 signal is approximately 1% of the amplitude (Vπ) of the main signal. Suppose that the operating point is shifted by 0.1×Vπ from the optimal bias point. By shifting the operating point, a component corresponding to the superimposed f0 signal appears in the monitored light of the optical modulator. Here, "A" is defined as the amplitude of the low-frequency component detected from the monitored light. The event probability of the low-frequency signal at the envelope curve part of the input drive signal of the NRZ scheme is 1. Representing the control sensitivity Sn of the bias control using the low-frequency signal f0 by the product of the amplitude of the low-frequency component detected from the monitored light and the event probability, the control sensitivity Sn can be expressed as follows.

$$Sn = A \times 1 = A$$

This control sensitivity Sn obtained in the NRZ scheme is set as the target sensitivity.

Next, in FIG. 6B, as in the case of the NRZ signal, a low-frequency signal (f0 signal) continuous in the direction of time is superimposed on an analog modulation signal. As in FIG. 6A, the operating point is shifted only by 0.1×Vπ from the optimal bias point. The occurrence frequency of the low-frequency component in the superimposed analog modulation signal has a normal distribution, and different low-frequency components are detected depending on the modulation voltage (v). In FIG. 6B, different low-frequency components are schematically drawn by a thick solid line and a thin solid line.

Representing the amplitude of the low-frequency component detected from the monitored light in each modulation voltage by a(v), and the event probability of the low-frequency component by b(v), the control sensitivity Sn can be expressed by an integrated value of the product of a(v) and b(v).

$$Sn = \int a(v)b(v)dv \quad (1)$$

In order to obtain the same control sensitivity as the control sensitivity Sn obtained with the NRZ signal, with the analog modulation signal of DMT or the like, the drive amplitude is required that satisfies the following Expression (2).

$$A = \int a(v)b(v)dv \quad (2)$$

A simulation result showed that Expression (2) is satisfied when the amplitude of the analog modulation signal is 0.88×Vπ. However, this drive amplitude allows entering the nonlinear region of the quenching characteristic curve, and thereby, the transmission capacity in DMT transmission degrades.

Figure 7:
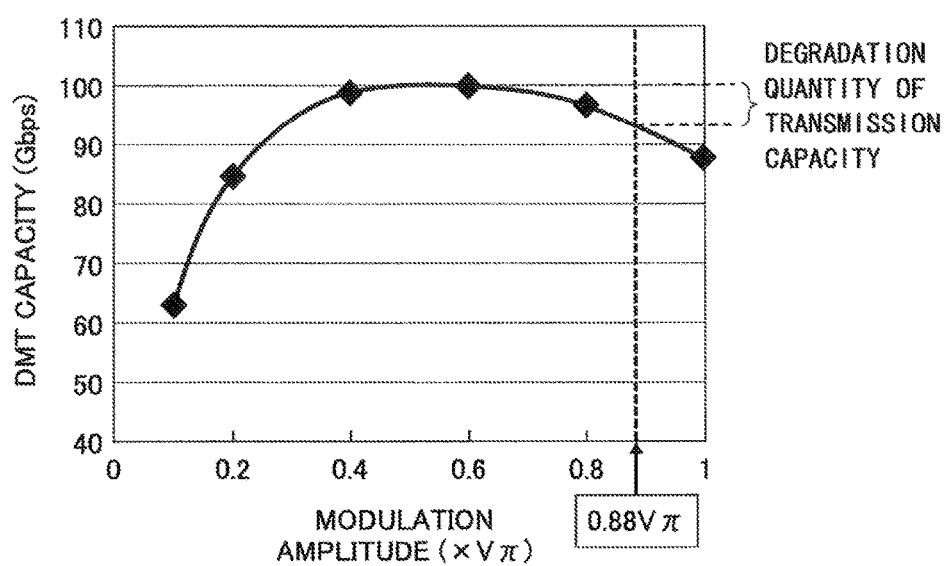
FIG. 7 is a diagram illustrating degradation of transmission capacity.

FIG. 7 is a diagram illustrating degradation of the DMT transmission capacity in the case of modulation amplitude being 0.88×Vπ. The horizontal axis represents the drive voltage (modulation voltage) and the vertical axis represents the DMT capacity. Compared with the maximum transmission capacity with 0.6×Vπ, the transmission capacity degrades with 0.88×Vπ. The ratio of the transmission degradation to the maximum transmission capacity is 0.058.

Figure 8:
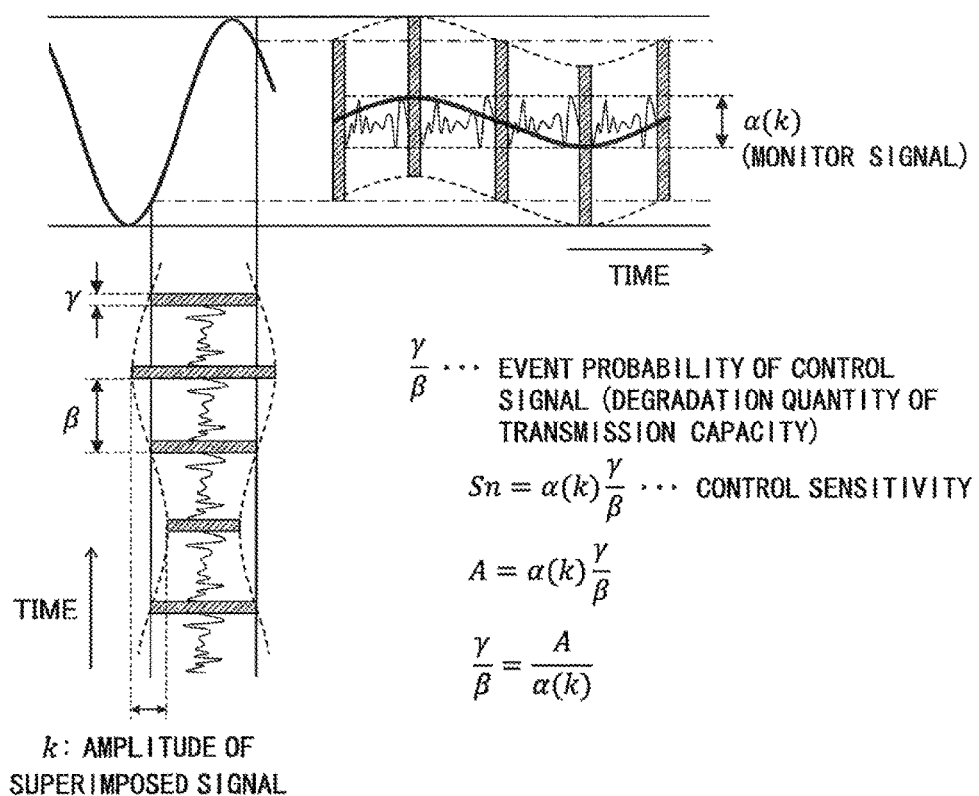
FIG. 8 is a diagram illustrating calculation of control sensitivity in an embodiment.

FIG. 8 is a diagram illustrating calculation of control sensitivity of the bias control in the embodiment. Representing the time width of a bias control signal inserted into an analog modulation signal at fixed intervals by γ, and the interval of insertion by β, the event probability of the bias control signal is represented by γ/β. The degradation quantity of the transmission capacity of the DMT signal is represented by the event probability γ/β.

Representing the amplitude of a low-frequency signal superimposed on the bias control signal by k, the amplitude of the bias component included in the monitored output of the optical modulator is represented by α(k). The control sensitivity Sn in the embodiment using the bias control signal inserted at fixed intervals is represented by the following Expression (3).

$$Sn=\alpha(k)\times(\gamma/\beta) \qquad (3)$$

In order to make the control sensitivity Sn be the same as the target control sensitivity A, it is necessary to select γ/β to satisfy $$A=\alpha(k)\times(\gamma/\beta),$$

therefore, $\gamma/\beta=A/\alpha(k)$.

Figure 9:
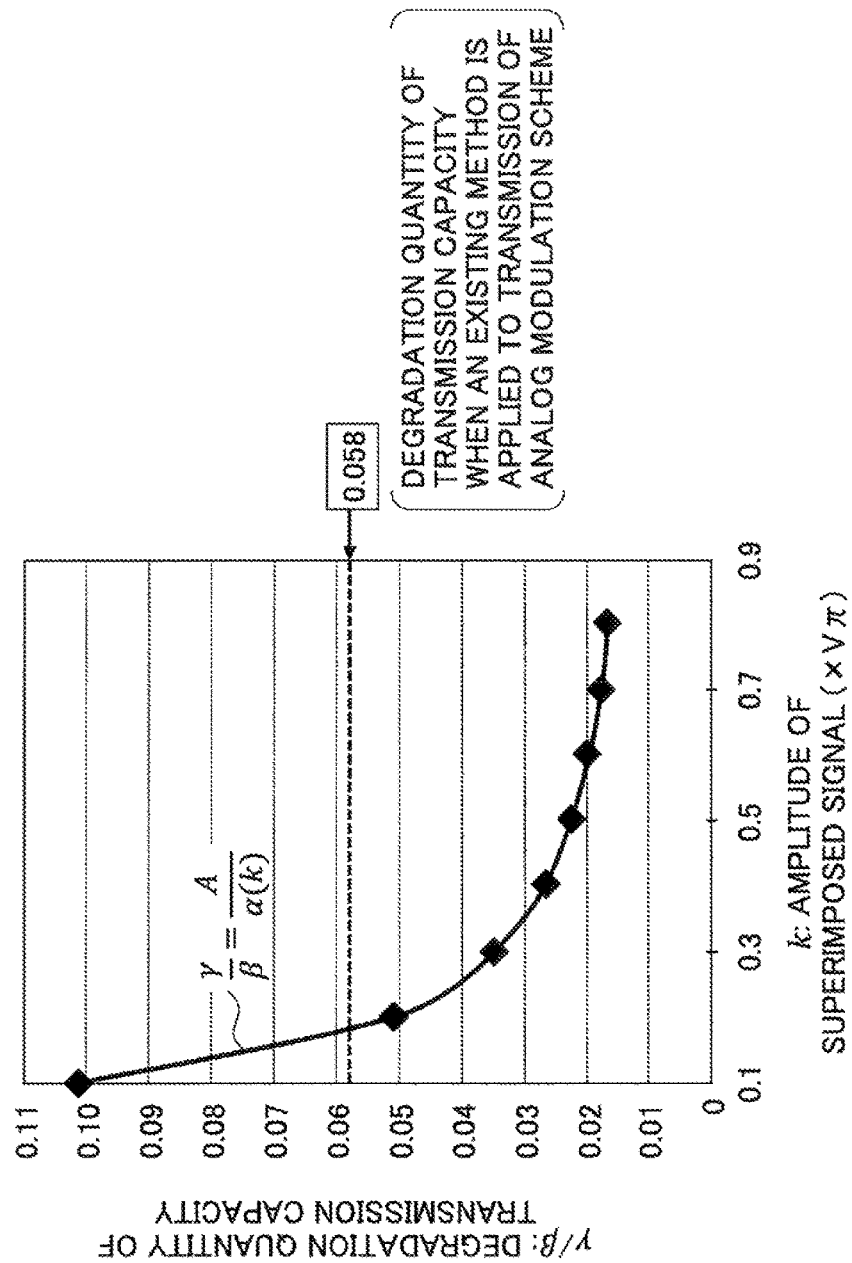
FIG. 9 is a diagram illustrating a relationship between the amplitude of a low-frequency signal superimposed on a bias control signal, and the degradation quantity of transmission of an analog light signal.

FIG. 9 is a diagram in which the degradation quantity of the transmission capacity (γ/β) is plotted as a function of the amplitude k of a low-frequency signal superimposed on the bias control signal. When the amplitude of the superimposed low-frequency signal is greater than or equal to 0.2×Vπ, it is possible to make the degradation quantity of transmission less than 0.058. In other words, by superimposing a low-frequency signal having the amplitude greater than or equal to 0.2×Vπ on a bias control signal, it is possible to control the degradation quantity of transmission within a small range, with the same control sensitivity as in the bias control in the NRZ scheme.

The optimal value of the amplitude of the low-frequency signal is determined from the time width γ and the insertion cycle β of the bias control signal to be inserted. For example, if a 32-bit bias control signal is inserted in a data signal being an analog signal such as DMT having the frame length of 1024 bits, it is possible to control the degradation quantity of transmission capacity to be around 0.03 (γ/β=32/(1024+32)). In this case, by superimposing a low-frequency signal having the amplitude of 0.35×Vπ on the bias control signal, it is possible to inhibit the degradation of transmission capacity while maintaining the control sensitivity.

Figure 10:
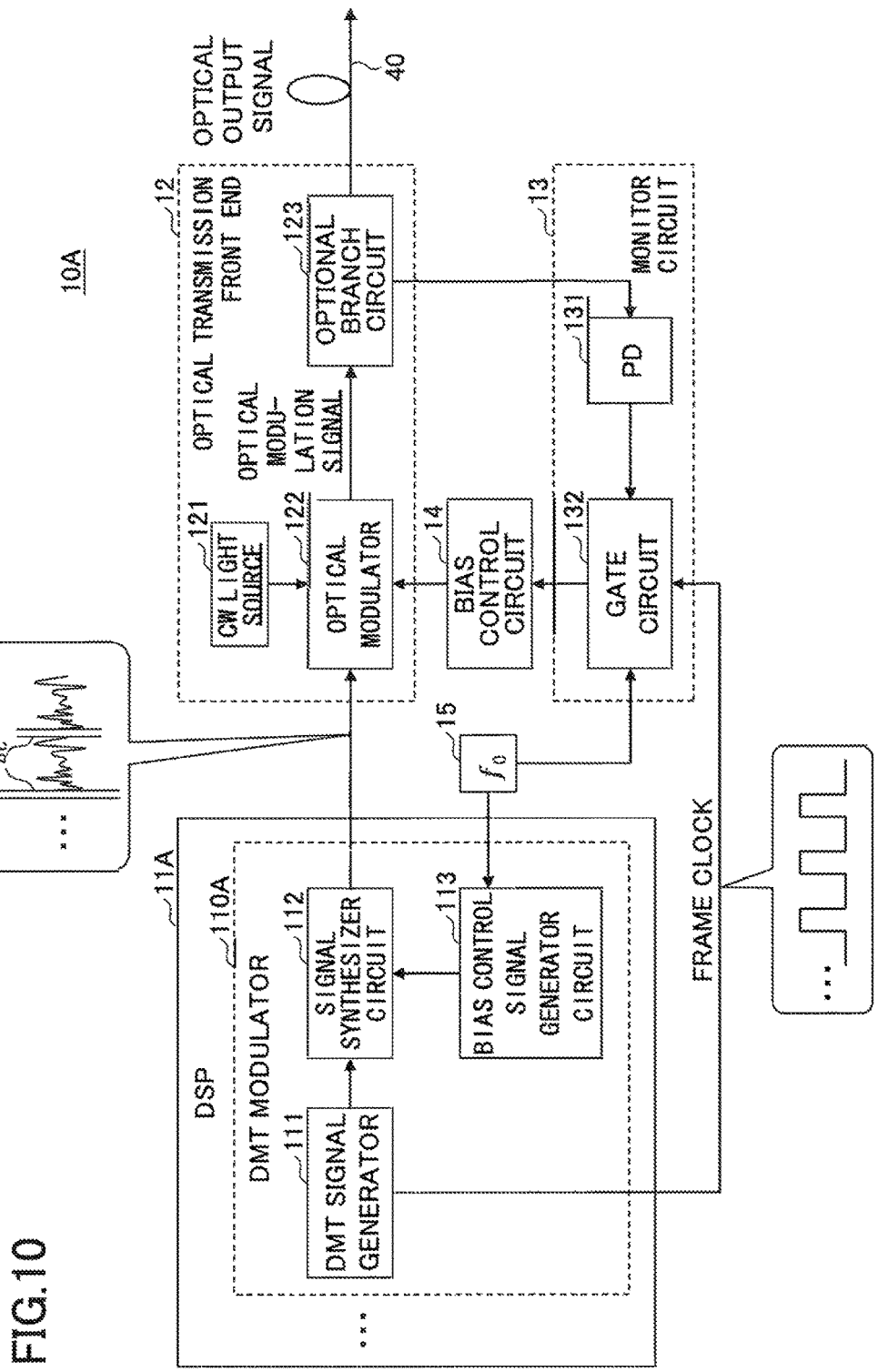
FIG. 10 is a general block diagram of an optical transmitter in an embodiment.

FIG. 10 is a general block diagram of an optical transmitter 10A according to the embodiment. The optical transmitter 10A includes a microprocessor 11A, an optical transmission front end circuit 12, a monitor circuit 13, a bias control circuit 14, and a low-frequency generator circuit 15. The microprocessor 11A is, for example, a DSP (Digital Signal Processor) and includes a DMT modulator 110A. The DMT modulator 110 includes a DMT signal generator 111, a signal synthesizer circuit 112, and a bias control signal generator circuit 113. Note that the DMT modulator is a multicarrier signal modulator, and the DMT signal generator is a multicarrier signal generator.

The DMT signal generator 111 allocates input transmission data to subcarriers, applies multi-value modulation to each subcarrier, and inserts a cyclic prefix into each symbol, to generate a DMT signal. The DMT signal is an example of a signal of an analog modulation scheme. The generated DMT signal is supplied to the signal synthesizer circuit 112.

The bias control signal generator circuit 113 generates a bias control signal to be inserted into the DMT signal. The bias control signal generator circuit 113 superimposes a low-frequency signal supplied from the low-frequency generator circuit 15 on the bias control signal, and outputs the bias control signal gently amplitude-modulated at a low frequency, to the signal synthesizer circuit 112. The amplitude of the low-frequency signal is set to an appropriate amplitude in advance, based on the time width and the insertion cycle of the bias control signal.

The signal synthesizer circuit 112 synthesizes the DMT signal with the bias control signal having the low-frequency signal superimposed, to generate an analog modulation signal. The bias control signal is inserted into predetermined sections of the analog modulation signal. It is desirable to insert the bias control signal into sections not holding main data. As a section not holding the main data, a section in which a cyclic prefix is inserted may be used. The output of the signal synthesizer circuit 112 is an analog modulation signal of the DMT signal in which the bias control signal SBC is inserted at fixed intervals.

The analog modulation signal is input into the optical modulator 122 of the optical transmission front end circuit 12. The optical transmission front end circuit 12 includes a light source 121 that outputs continuous light (CW), an optical modulator 122, and an optical branch circuit 123. A bias voltage that determines the operating point is applied to the optical modulator 122. Light output from the light source 121 is input into the optical modulator 122, and is modulated by the drive signal of the analog modulation scheme. The modulated light is output from the optical modulator 122 as an optical modulation signal, and is output to a transmission line 40.

A part of the optical modulation signal is branched off by the optical branch circuit 123, to be supplied to the monitor circuit 13. The monitor circuit 13 includes a photosensor 131 such as a photodiode (PD) and a gate circuit 132. The monitored signal detected by the photosensor 131 and converted into an electric signal is input into the gate circuit 132.

The gate circuit 132 receives as input a frame clock output from the DMT signal generator 111, and a low-frequency signal generated by the low-frequency generator circuit 15. The gate circuit 132 synchronously demodulates a bias component included in the monitored signal with a low-frequency signal, at the timing of the frame clock. The demodulation result is supplied to the bias control circuit 14.

In the case where a bias component is included in the monitored signal, the bias control circuit 14 adjusts the bias voltage of the optical modulator 122 so that the detected bias component becomes the minimum. If the phase of a low-frequency bias component detected by the gate circuit 132 is in phase with the low-frequency signal superimposed on the bias control signal, it represents that the operating point is shifted from the optimal bias point to the minus side. In this case, the bias control circuit 14 increases the bias voltage applied to the optical modulator 122. In the case where a bias component that changes in reverse phase with the low-frequency signal superimposed on the bias control signal is detected, the bias control circuit 14 decreases the bias voltage applied to the optical modulator 122.

This configuration makes it possible to reduce the degradation of the transmission capacity, and to correct the operating point drift while maintaining the targeted control sensitivity.

Figure 11:
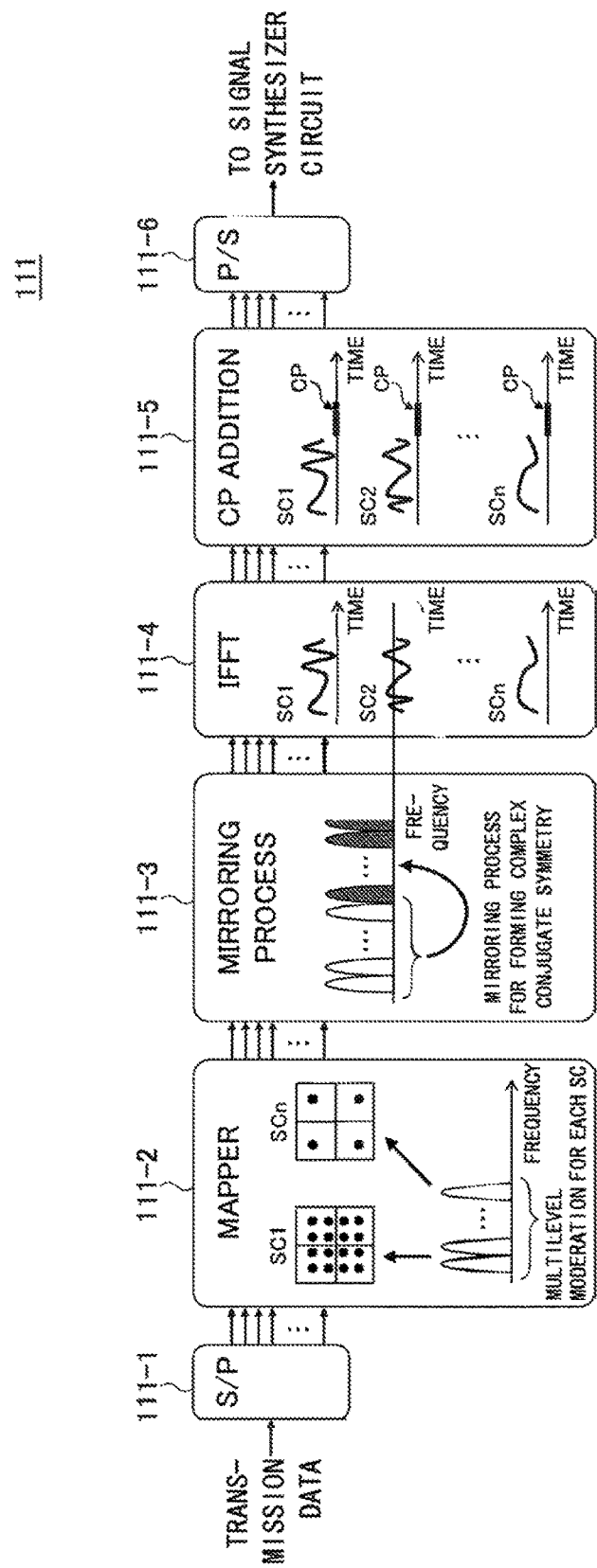
FIG. 11 is a schematic view of a DMT signal generator (a multicarrier signal generator) on the transmission side.

FIG. 11 illustrates an example of a configuration of the DMT signal generator 111. The DMT signal generator 111 includes a serial-to-parallel (SP) converter 111-1, a mapper 111-2, a mirroring process circuit 111-3, an IFFT (Inverse Fast Fourier Transform) circuit 111-4, a CP addition circuit 111-5, and a parallel-to-serial (PS) converter 111-6.

The serial-to-parallel (SP) converter 111-1 converts serial transmission data received as input into multiple series of parallel data, and outputs the parallel data to the mapper 111-2. The mapper 111-2 maps the parallel data (digital bit sequences) input from the SP converter 111-1 onto signal points on the complex plane (constellation) for each subcarrier. The mirroring process circuit 111-3 applies mirroring to each subcarrier so as to be symmetrical as complex conjugates. The IFFT (Inverse Fast Fourier Transform) circuit 111-4 applies an inverse Fourier transform to the signal mirrored for each subcarrier, and converts the signal in the frequency domain into a signal in the time domain. The CP addition circuit 111-5 inserts a CP at the head of a symbol as a guard interval for each subcarrier. The PS converter 111-6 converts multiple subcarrier signals into serial data, and outputs the data. The serial data is converted into an analog signal, and the analog signal is supplied to the signal synthesizer circuit 112.

In the case of using the DMT signal generator 111 as configured in FIG. 11, it is possible to insert a bias control signal modulated at a low frequency by using CP inserted sections. The time width γ of the bias control signal corresponds to the length of a CP insertion section, and the insertion interval of the bias control signal corresponds to the symbol length. By using the CP sections, sections not holding valid data can be used for inserting the bias control signal, which is advantageous. However, the insertion timings of the bias control signal are not necessarily limited to the CP sections. In the case where subcarriers not being next to each other are serially arranged, a guard interval with which γ/β takes a desired value as illustrated in FIG. 9, may be provided between symbols so as to set the amplitude of the low-frequency signal to an appropriate value.

Figure 12:
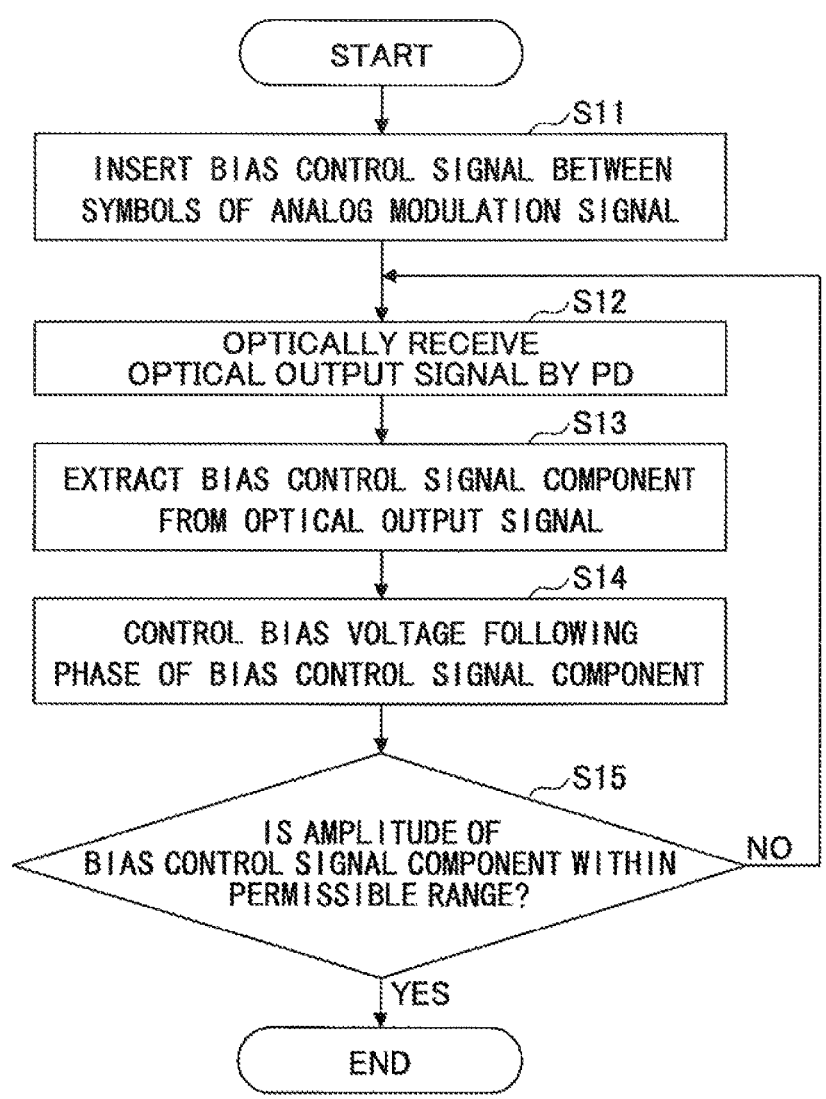
FIG. 12 is a diagram illustrating an operation flow of an optical transmitter in an embodiment.

FIG. 12 illustrates an operation flow of the optical transmitter 10A in the embodiment. A bias control signal is inserted between symbols of an analog modulation signal (Step S11). The bias control signal is amplitude-modulated with a low-frequency signal that changes in reverse phase with respect to the amplitude center of the main signal. The time width and the insertion interval of the bias control signal, and the amplitude of the low-frequency signal are set within respective ranges to keep the degradation of the transmission capacity to a minimum.

The optical modulator is driven by the analog modulation signal having the bias signal inserted, and the output signal of the optical modulator is optically received, from which a monitored signal is generated (Step S12). A low-frequency component of the bias control signal is extracted from the monitored signal (Step S13). In the case where a low-frequency component is extracted from the monitored signal, following the phase of the extracted low-frequency component, the controlling direction of the bias voltage is determined, with which the operating point of the optical modulator is determined. As described above, if the phase of the low-frequency component of the bias control signal extracted from the monitored signal is in phase with the low-frequency signal superimposed on the bias control signal, the bias voltage is increased, or if in reverse phase, the bias voltage is decreased.

The bias control circuit 14 determines whether the amplitude of the low-frequency component detected in the monitored signal is less than or equal to a predetermined threshold value (is contained within a permissible range) (Step S15). Steps S12-S15 are repeated until the magnitude of the detected low-frequency component becomes contained within a permissible range, or becomes the minimum.

In this way, it is possible to control degradation of the transmission capacity, and to maintain the operating point of the optical modulator at the optimal bias point with a high control sensitivity. The process in FIG. 12 may be periodically performed while the optical transmitter 10A is under operation, or may be started by a command input from the outside when distortion of the modulation signal increases beyond a permissible range.

Figure 13:
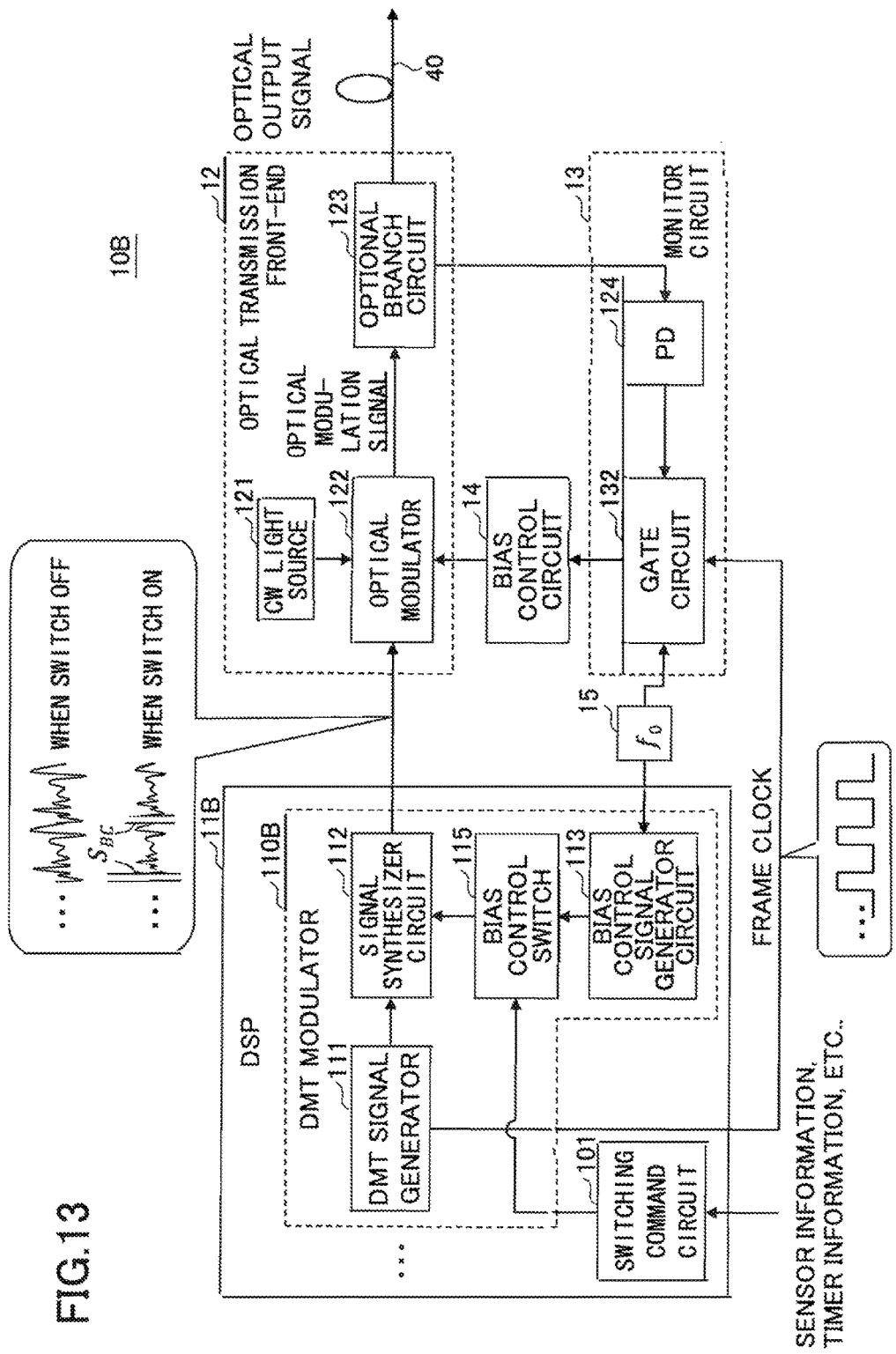
FIG. 13 is a diagram illustrating a modified example of an optical transmitter in an embodiment.

FIG. 13 is a general block diagram of an optical transmitter 10B as a modified example of the optical transmitter 10A. A microprocessor 11B of the optical transmitter 10B includes a switching command circuit 101, and a multichannel signal modulator 110B includes a bias control switch 115. The bias control switch 115 is placed, for example, between a bias control signal generator circuit 113 and a signal synthesizer circuit 112. The bias control switch 115 turns on and off input of the bias control signal to the signal synthesizer circuit 112, based on a switching command from the switching command circuit 101. A logic circuit or a selector may be used as the switch.

The switching command circuit 101 outputs a switching command, based on environment information that may include a cause of a shift of the operating point of the optical modulator 122. The operating point of the optical modulator 122 drifts depending on temperature change or aging. Temperature sensor information and timer information may be input into the switching command circuit 101 from the outside of the microprocessor 11B, or the microprocessor 11B may have a timer built in. In the case of using temperature sensor information, a switching command may be output when the temperature change is greater than or equal to a fixed value. In the case of using a timer, a switching command may be output periodically once in a day, once in a week, or the like.

When the bias control switch 115 is turned on, a bias control signal $S_{BC}$ is inserted into an analog signal such as DMT by the signal synthesizer circuit 112, and the analog modulation signal having the bias control signal $S_{BC}$ inserted is input into the optical modulator 122. When the bias control switch 115 is turned off, a DMT signal generated by the signal synthesizer circuit 112 is input into the optical modulator 122 as it is as the drive signal. The configuration and operations of the bias control when the bias control switch 115 is turned on are the same as described with reference to FIG. 10.

In the configuration in FIG. 13, since the bias control signal is inserted when a drift correction of the operating point is necessary, it is possible to maintain a high data rate. In the case where drift correction of the operating point is necessary at the expense of a somewhat reduced data rate, a bias control signal is generated with a value of γ/β and an amplitude value of the low-frequency signal that are set so as to obtain the maximum control sensitivity for a desired transmission capacity.

By this configuration, it is possible to correct the operating point drift efficiently while reducing degradation of the transmission capacity.

Figure 14:
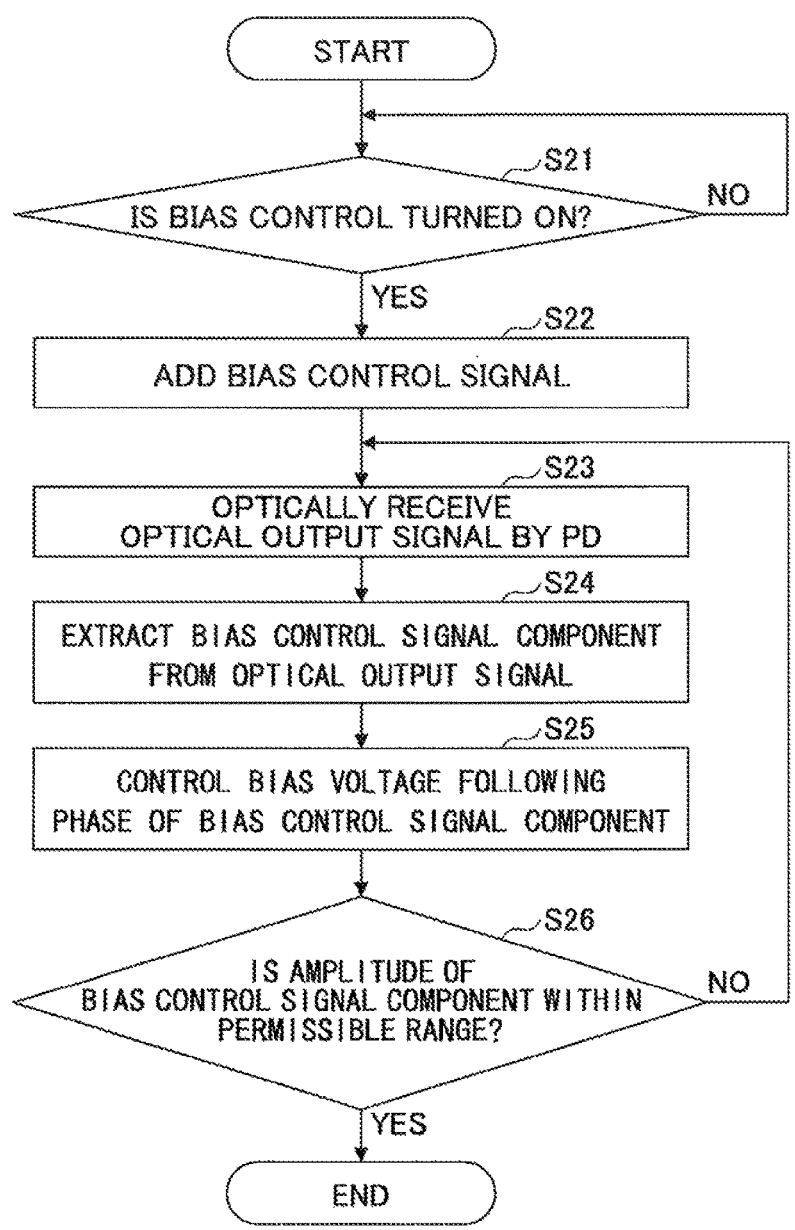
FIG. 14 is a diagram illustrating an operation flow of an optical transmitter in a modified example.

FIG. 14 illustrates an operation flow of the optical transmitter 10B in the modified example. First, the switching command circuit determines whether the bias control is to be turned on (Step S21). If the bias control is not to be turned on (NO at Step S21), waiting continues until the bias control is determined to be turned on. Once the bias control is turned on (YES at Step S21), the signal synthesizer circuit 112 inserts a bias control signal between symbols of an analog signal (Step S22). A part of the output signal of the optical modulator is optically received by a photodetector (Step S23) to generate a monitored signal, and a low-frequency component of the bias control signal is extracted from the monitored signal (Step S24). Following the phase of the low-frequency component of the bias control signal, a controlling direction of the bias voltage is determined to determine the operating point of the optical modulator, and to adjust the value of the bias voltage (Step S25). Then, it is determined whether the amplitude of the low-frequency component of the bias control signal included in the monitored signal is contained within the permissible range (Step S26), and if not contained, Steps S23 to S26 are repeated until the magnitude of the detected low-frequency component becomes contained within the permissible range, or becomes the minimum.

In this way, the bias control is performed when an operating point drift needs to be corrected, while maintaining the data rate as high as possible. Since the time width γ and the insertion interval β of the bias control signal used for the bias control are selected such that a maximum control sensitivity is obtained with a minimum degradation quantity of the transmission capacity, it is possible to control the operating point with a high sensitivity while inhibiting degradation of the transmission capacity.

Figure 15:
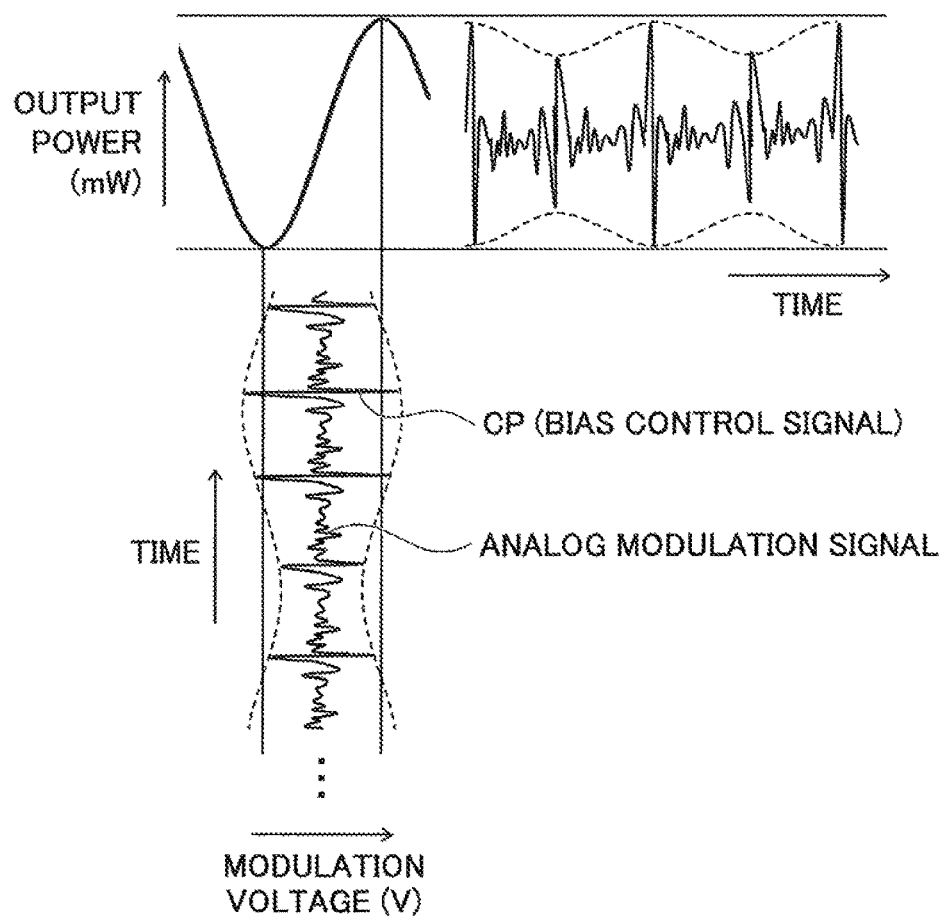
FIG. 15 is a diagram illustrating an example in which a cyclic prefix is used as a control signal.

FIG. 15 illustrates an example in which a cyclic prefix itself is used as a bias control signal inserted into a signal of an analog modulation scheme. A part at the rear of a symbol waveform is copied or repeated to be used as the cyclic prefix. By increasing the amplitude of the cyclic prefix and superimposing with a low-frequency signal, it is possible to use it as a bias control signal that changes in a nonlinear region.

Figure 16:
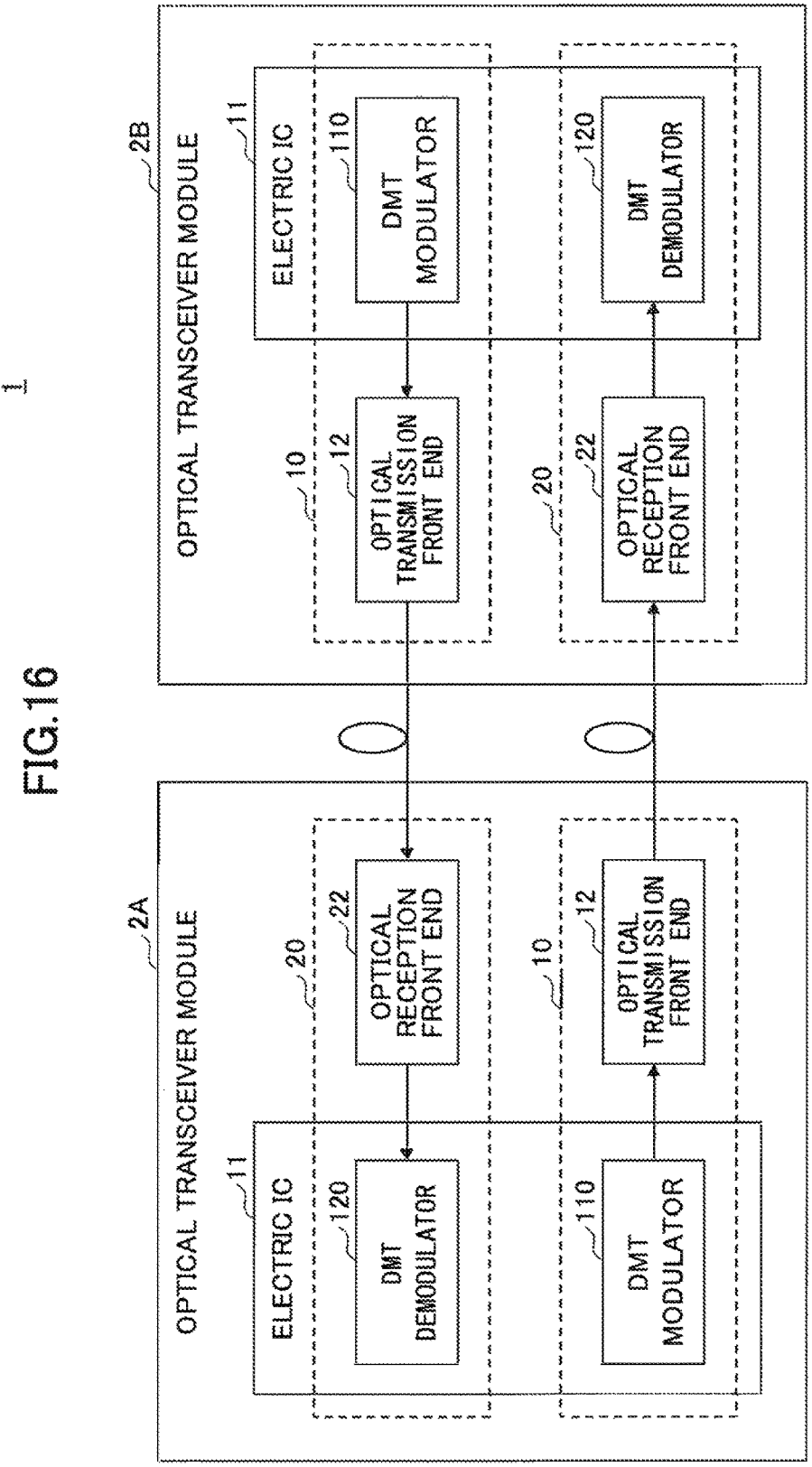
FIG. 16 is a schematic view of an optical transceiver to which an optical transmitter in an embodiment is applied.

FIG. 16 is a schematic view of an optical transmission system 1 that uses optical transceiver modules 2A and 2B each including an optical transmitter 10 according to the embodiment. Since the optical transceiver modules 2A and 2B have the same configuration, the optical transceiver module 2A will be described.

The optical transceiver module 2A includes an optical transmission front end circuit 12, an optical reception front end circuit 22, and an electric IC (Integrated Circuit) 11. The electric IC 11 includes a DMT modulator 110 and a DMT demodulator 120. The optical transmitter 10 is constituted with the optical transmission front end circuit 12 and the DMT modulator 110. The optical receiver 20 is constituted with the optical reception front end circuit 22 and the DMT demodulator 120. Note that the DMT modulator is a multicarrier signal modulator, and the DMT demodulator is a multicarrier signal demodulator.

The DMT demodulator 120 performs a process in inverse relation to generation of the DMT signal in FIG. 11. The DMT demodulator 120 converts a serially received signal, which is obtained by digital sampling, into parallel data for each symbol, removes the CP for each subcarrier, and performs an FFT process. The DMT demodulator 120 takes out only the real part from the signal in the frequency domain to identify a reception symbol in the constellation plane, and extracts (demaps) bits mapped as the reception symbol, to be demodulated as a subcarrier. The demodulated subcarrier signal is converted into a serial signal, and is output as reception data.

The optical transmitter of the optical transceiver module 2A may be either of an optical transmitter 10A in FIG. 10 or an optical transmitter 108 in FIG. 13. In either case, by using a bias control signal to be inserted with an appropriate time width γ and an appropriate cycle β, it is possible to minimize degradation of the transmission capacity and to control the operating point drift of the optical modulator with a high sensitivity.

The embodiments described above are examples of the present invention, and may cover various modified examples. In the embodiment, although an example is used in which the operating point is set to one half of the peak of light power output, virtually the same effect can also be obtained in the case where the operating point is set to the quenching point in I/Q modulation. Also, the embodiments can be applied not only to a DMT signal, but also to an analog light modulation scheme of RoF and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitter comprising:
   an optical modulator configured to modulate light from a light source; and
   a processor configured to generate a drive signal that is input into the optical modulator,
   wherein the processor inserts a bias control signal amplitude-modulated with a low-frequency signal, into an analog signal at fixed intervals, to generate the drive signal,
   wherein the processor inserts the bias control signal in a section of the analog signal in which effective transmission data is not held.

2. The optical transmitter as claimed in claim 1, wherein the processor inserts the bias control signal into a guard section of the analog signal.

3. The optical transmitter as claimed in claim 1, wherein the processor uses a cyclic prefix included in the analog signal, as the bias control signal.

4. The optical transmitter as claimed in claim 1, wherein a time width and an insertion interval of the bias control signal are set such that degradation quantity of a transmission capacity of the analog signal is controlled to be contained within a predetermined range.

5. The optical transmitter as claimed in claim 4, wherein an amplitude of the low-frequency signal is set corresponding to the time width and the insertion interval of the bias control signal.

6. The optical transmitter as claimed in claim 1, wherein an amplitude of the low-frequency signal is set greater than or equal to 0.2 times a half-wavelength voltage in a quenching characteristic of the optical modulator.

7. The optical transmitter as claimed in claim 1, wherein the processor includes a bias control switch and a switching command circuit, and inserts the bias control signal into the analog signal when the bias control switch is turned on based on output of the switching command circuit.

8. The optical transmitter as claimed in claim 1, further comprising:
   a monitor circuit configured to monitor output light from the optical modulator; and
   a bias control circuit configured to control a bias voltage that determines an operating point of the optical modulator based on monitored output of the monitor circuit.

9. An optical transceiver comprising:
   the optical transmitter as claimed in claim 1; and
   an optical receiver.

10. An optical transmission method, executed by an optical transmitter, the method comprising:

generating an analog modulation signal by inserting a bias control signal amplitude-modulated with a low-frequency signal, into an analog signal at fixed intervals; and inputting the analog modulation signal into an optical modulator, to modulate light to be output from a light source, wherein the bias control signal is inserted in a section of the analog signal in which effective transmission data is not held.

11. The optical transmission method as claimed in claim 10, wherein the bias control signal is inserted into a guard section of the analog signal.

12. The optical transmission method as claimed in claim 10, wherein a cyclic prefix included in the analog signal is used as the bias control signal.

13. The optical transmission method as claimed in claim 10, wherein a time width and an insertion interval of the bias control signal are set such that degradation quantity of a transmission capacity of the analog signal is controlled to be contained within a predetermined range.

14. The optical transmission method as claimed in claim 13, wherein an amplitude of the low-frequency signal is set corresponding to the time width and the insertion interval of the bias control signal.

15. The optical transmission method as claimed in claim 10, wherein an amplitude of the low-frequency signal is set greater than or equal to 0.2 times a half-wavelength voltage in a quenching characteristic of the optical modulator.

16. The optical transmission method as claimed in claim 10, wherein bias control is switched between on and off based on environment information or time information, and the bias control signal is inserted into the analog signal when the bias control is turned on.

17. The optical transmission method as claimed in claim 10, the method further comprising:

monitoring light output from the optical modulator; and
controlling a bias voltage that determines an operating point of the optical modulator based on a monitored result.

* * * * *